United States Patent
Braschel et al.

Patent Number: 5,368,373
Date of Patent: Nov. 29, 1994

[54] METHOD FOR CONTROLLING THE BRAKE PRESSURE IN AN ANTI-LOCK BRAKE SYSTEM OF A DUAL-TRACK VEHICLE

[75] Inventors: Volker Braschel; Dieter Seitz, both of Neuwied, Germany

[73] Assignee: Lucas Industries public limited company, Birmingham, England

[21] Appl. No.: 92,579

[22] Filed: Jul. 16, 1993

Related U.S. Application Data

[63] Continuation of Ser. No. 689,273, Jun. 13, 1993, abandoned.

[30] Foreign Application Priority Data

Oct. 13, 1989 [DE] Germany .............. 3934308

[51] Int. Cl.$^5$ .................................. F16F 3/00
[52] U.S. Cl. ................... 303/111; 303/100; 364/426.02
[58] Field of Search .............. 303/97, 100, 111, 113.1, 303/113.5, 106, 109; 364/426.02

[56] References Cited

U.S. PATENT DOCUMENTS

| | | | |
|---|---|---|---|
| 3,893,693 | 7/1975 | Skoyles | 303/68 X |
| 4,320,459 | 3/1982 | Lindemann et al. | 303/111 X |
| 4,585,280 | 4/1986 | Leiber | 303/100 |
| 4,660,896 | 4/1987 | Matsuda | 303/97 X |

FOREIGN PATENT DOCUMENTS

| | | |
|---|---|---|
| 0177817 | 9/1984 | European Pat. Off. . |
| 2430874 | 2/1980 | France . |
| 1914765 | 3/1969 | Germany . |
| 3209369 | 9/1983 | Germany . |
| 3410083 | 3/1984 | Germany . |
| 3815732 | 5/1988 | Germany . |
| 2016621 | 9/1979 | United Kingdom . |
| 2026113 | 1/1980 | United Kingdom . |

*Primary Examiner*—Robert J. Oberleitner
*Assistant Examiner*—Lee W. Young
*Attorney, Agent, or Firm*—Oblon, Spivak, McClelland, Maier & Neustadt

[57] ABSTRACT

A method of controlling the brake pressure in an antilock brake system of a dual-track vehicle wherein pressure raising pulse trains are applied to the brakes of the rear wheels of the vehicle provides for modified "select-low" control of a kind with which the brake of the one wheel which first is instable on the rear axle is fed with a pressure raising pulse train having a smaller mark-to-space ratio or pulse duty factor than the pressure raising pulse train applied to the brake of the other, the stable wheel of the rear axle.

2 Claims, 2 Drawing Sheets

METHOD FOR CONTROLLING THE BRAKE PRESSURE IN AN ANTI-LOCK BRAKE SYSTEM OF A DUAL-TRACK VEHICLE

This application is a continuation of application Ser. No. 07/689,273, filed on Jun. 13, 1991, now abandoned.

The invention relates to a method of controlling the brake pressure in an anti-lock brake system of a dual-track vehicle wherein the rotational speeds of the wheels and/or their rotational accelerations are measured and compared with threshold values so as to select from among wheels mounted in different tracks of the rear axle the one which is the first to show instability and derive from its rotational speed or slip control signals for decrease and increase of the brake pressure in the brakes of the wheels and apply pressure raising pulse trains to the rear wheel brakes in response to those control signals.

A number of algorithms are known for control of the brake pressure in an anti-lock vehicle brake system. Likewise known are the most diverse kinds of measuring means, valves, and control equipment to accomplish anti-lock (ABS) brake control. New methods of control of the brake pressure in ABS installations are realized by corresponding programming of a processor, while making use of known measuring and control devices (number of revolution sensors, valves, etc.).

Accomplishment of the aim of ABS control of obtaining the shortest possible stopping distance at good steerability of the vehicle is rendered more difficult by the circumstance that the optimizing of ABS control depends essentially on road and vehicle conditions. The control must be adapted to the respective existing conditions which may change constantly and about which the computer controlling the anti-lock braking receives only very indirect and limited information.

When a wheel tends to become locked because of its slip or rotational retardation, that wheel is called "instable". If, on the other hand, the rotational retardation or slip of a wheel do not yet give rise to fears of locking, that wheel is deemed "stable".

It is especially the lateral guidance of the rear wheels which is essential for the good steerability of a vehicle. If a rear wheel begins to suffer too much slip, i.e. if it becomes instable, the stability of steering of the vehicle is at risk due to the related reduced possibility of lateral guidance of the wheel. A highly undesired torque may result about the vertical axis of the vehicle, the so-called yawing moment.

It is known in the art to subject the wheels of the rear axle of the vehicle to a so-called "select low" control in order to warrant good steerability (stability) of the vehicle. In "select low" control it is assumed that one wheel of the rear axle of a dual-track vehicle becomes instable more quickly than another. That may be due to various reasons (see below). Pure "select low" control in such an event provides that also the wheel on the rear axle still running stably is subjected to anti-lock control, i.e. the pressure is diminished and subsequently increased, as at the instable wheel, and that may be repeated many times one after the other.

It is also known in the art (EP-0 177 817) to effect pulsed pressure increase at the brakes, especially of the rear wheels. In that way better matching of the brake pressure to the desired value is achieved and so-called "overshooting" of the brake pressure is avoided.

Pure "select low" control of the kind described above does have the advantage of good steerability of the vehicle. But it involves the disadvantage of giving away distance to stop because the stable rear wheel could be retarded more.

It is not only different road conditions which may lead to different stabilities of the two rear wheels of a vehicle but also other circumstances, such as different filling volumes of the wheel brake cylinders and/or tolerances in valve switching times and/or tolerances in valve throttling. Therefore, even if the electrical control of the valves is absolutely identical, different pressures may result in the brakes at the two rear wheels whereby one wheel will become instable more quickly than the other. Even if the hydraulic pressures in the brakes of both rear wheels are exactly the same, the resulting braking moment need not be the same at both wheels because differences in the coefficient of friction of the brake lining and the disc or the friction lining and the drum also may cause different braking.

DE 32 09 369 A1 describes ABS control wherein forced control takes place at the so-called high wheel to avoid great yawing moments and reduce the distance to stop. Different pulse-duty factors are used at the low and high wheels.

DE 19 14 765 C2 shows possibilities of varying the duration/spacing ratio between zero and infinite in response to the wheel behavior so that any desired pressure increase gradient may be adjusted. That control, however, relates to a single wheel only.

In the case of the brake system according to DE 34 10 083 A1 the onset of control at the low wheel causes the pressure at the other wheel to be raised until the high wheel, too, gets into a state of control.

DE 38 15 732 A1, which is not a prior publication, discloses modified "select low" control which has the same object as the instant invention, namely to achieve a better braking effect while maintaining the advantages of the "select low" control. The advantages of the "select low" control are to be seen above all in the fact that good stability of the vehicle upon braking is obtained at little expenditure (circuitry and software).

The above mentioned, not previously published DE 38 15 732 A1 comprises an additional circuit to effect correction of the braking moments at the two rear wheels. The instant invention does not require an additional circuit, it is implemented instead by a corresponding software program. Moreover, in the case of DE 38 15 732 the differences in braking moments are determined at the two rear wheels. With the instant invention, on the other hand, the surpassing of predetermined threshold values serves as an indication of instability of the wheels.

Finally, the earlier application discussed here also suggests that the brake of the stable wheel be pressurized more in order to achieve a higher braking moment at this wheel. The instant invention, by contrast, teaches that less pressure be admitted to the instable wheel and that that be done upon termination of the first control cycle.

Figure 1:
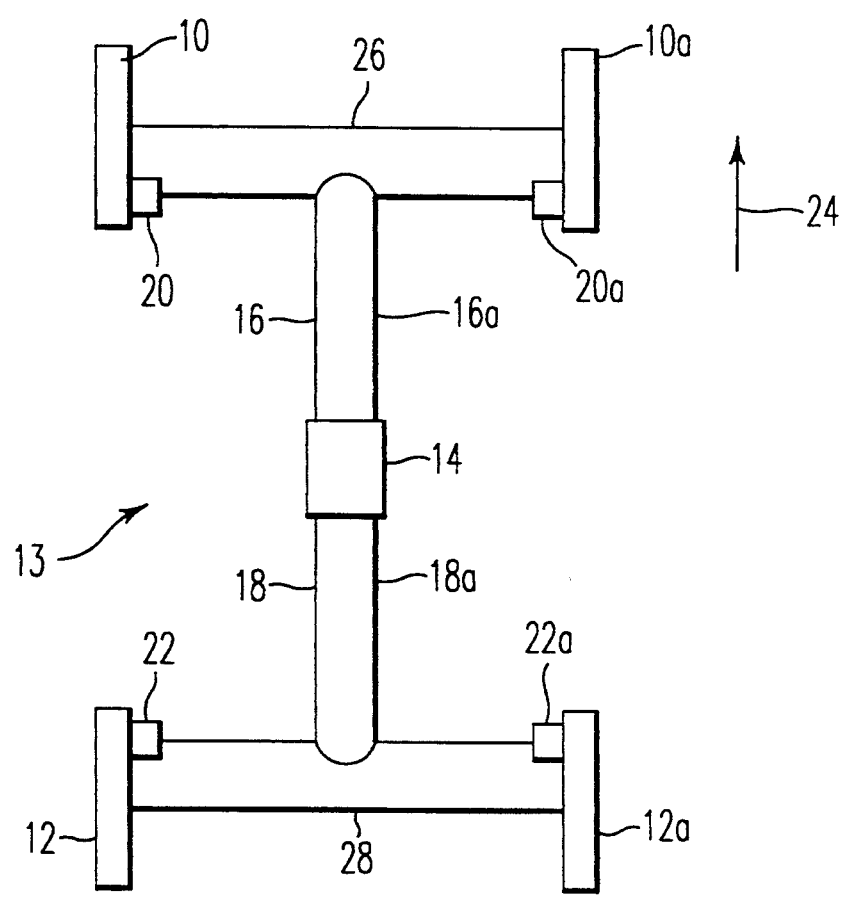
FIG. 1 is a schematic representation of a vehicle braking system controlled by the method of the invention.
Figure 2:
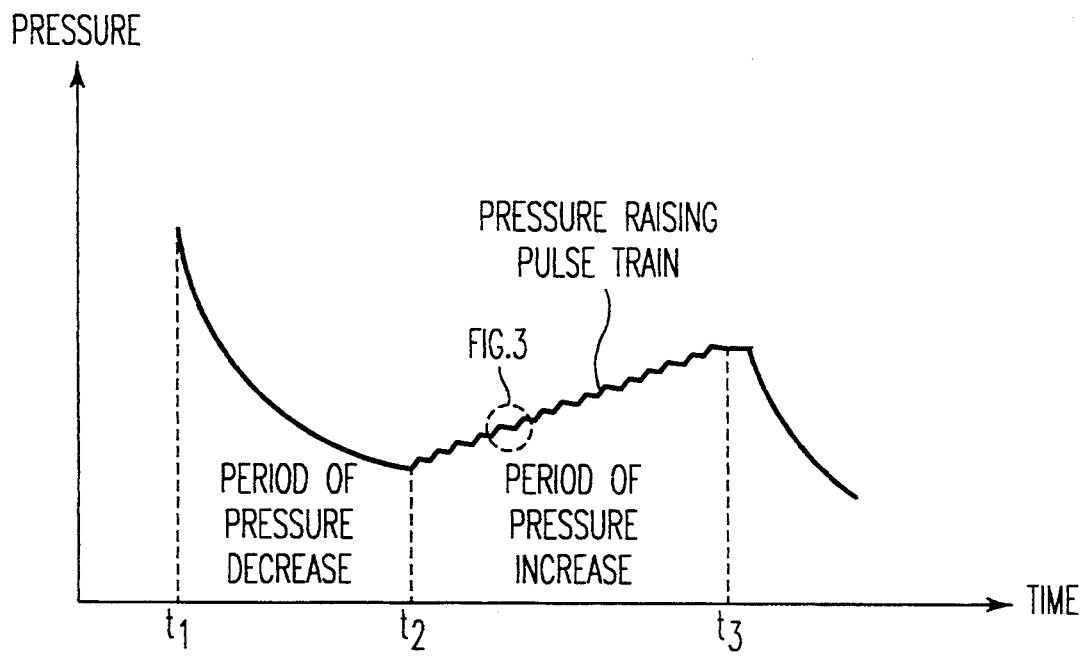
FIG. 2 is a graphical representation of a pulse train of the type utilized in the invention.
Figure 3:
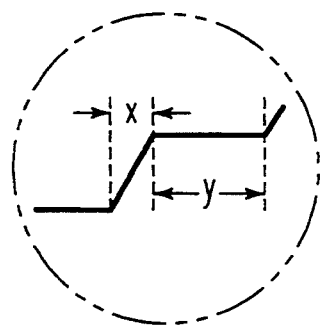
FIG. 3 is an enlarged view of matter within the circle marked III in FIG. 2.

The ABS control algorithm according to the invention results in brake behavior which differs from that produced by the control method according to DE 38 15 732, especially in driving through curves or with different road conditions under the left and right wheels of the vehicle (so-called μ split).

The invention has for its object to modify so-called "select low" control such that the advantages mentioned above are maintained, while the distance to stop is reduced.

In accordance with the invention it is provided that this object be met in that the brake of the one wheel which first is instable on the rear axle, having reached a stable state in response to release of pressure, is fed with a pressure raising pulse train which has a smaller mark-to-space ratio than the pressure raising pulse train applied to the brake of the other, stable wheel of the rear axle.

As in electronics the term "mark-to-space ratio" is understood as the relationship between pulse duration and period between pulses in a pulse train or series of pulses.

In accordance with another embodiment of the inventive concept it is provided that the brake of the one wheel which first is instable on the rear axle, having reached a stable state in response to release of pressure, is fed with a pressure raising pulse train which has a smaller pulse repetition rate than the pressure raising pulse train applied to the brake of the other, stable wheel of the rear axle.

The pulse repetition rate is the inverse value of the period duration of the periodically repeated sequence of individual pulses.

The invention thus provides for different adjustments of the pulse widths (lengths of individual pulses) of the pressure raising pulse trains at the brakes of the rear wheels of the vehicle if instability of the so-called high wheel has not yet occurred during an instability phase of the so-called low wheel (i.e. the wheel which becomes instable sooner due to one of the reasons mentioned above), in other words if the high wheel still displays slip and rotational retardation that do not indicate a tendency of locking.

It is a prerequisite for the control according to the invention that both wheels of the rear axle of the vehicle do not become instable.

According to preferred modifications of the invention it is provided that the differences of the pulse-duty factors or pulse repetition rates of the pressure raising pulse trains are made dependent on the extent of instability of the instable wheel, i.e. the measure by which the rotational retardation or slip of this wheel exceeds given threshold values.

According to another modification of the invention it is provided that the difference of the mark-to-space ratios (pulse widths) or pulse repetition rates be limited, and this limitation is made to a predetermined maximum value. That has the advantage of setting a limit to the differences in braking moments occurring at the two rear wheels during braking on roads which have inhomogeneous coefficients of friction or braking in curves, and good lateral guiding power is maintained at least at the wheel which runs more stably. Yet the predetermined difference is set at a high enough value to compensate the above mentioned deviations of brake pressures due to different filling volumes of the wheel brake cylinders and/or tolerances in valve switching times and/or tolerances in valve throttling so that not only good lateral guiding power is available at the rear axle wheels but also a strong braking effect is achieved by them.

The invention thus makes it possible to accomplish modified "select low" control using the same electrical control times (clock sequences) for each rear wheel. All that need be varied according to a preferred embodiment of the invention is the mark-to-space ratio or pulse-duty factor.

What is claimed is:

1. A method of controlling braking pressure of brakes in an anti-lock brake system for wheels of a dual-track vehicle wherein the rotational speeds and accelerations of said wheels are measured and compared with threshold values so as to select from among wheels mounted in different tracks of a rear axle of said vehicle one wheel which is first to show instability relative to another stable wheel on said axle and derive from the rotational speed of said one wheel slip control signals for controlling in respective cycles, first, a period of decrease and then a period of increase of the brake pressure in the brakes of both wheels on said rear axle, each period of pressure increase during any one anti-lock cycle in said brakes of the wheels on said rear axle being by the application of pressure raising pulse trains thereto in response to said slip control signals, said pressure raising pulse trains being defined by the mark-to-space ratio of the pressure raising pulses, characterized in that the brake of said one wheel which first is instable on said rear axle, having reached a stable state in response to release of pressure, is fed during each period of pressure increase with a pressure raising pulse train which has a smaller mark-to-space ratio than the pressure raising pulse train applied to the brake of the other, stable wheel and thereby causes a smaller pressure rise in the brake of said one wheel than the pressure raising pulse train applied to the brake of the other, stable wheel of the rear axle, said mark-to-space ratio of the pressure raising pulse trains being dependent on the measure by which the rotational retardation or slip of the one wheel exceeds a given threshold value and wherein a maximum value is predetermined for said mark-to-space ratio.

2. A method of controlling braking pressure of brakes in an anti-lock brake system for wheels of a dual-track vehicle wherein the rotational speeds and accelerations of said wheels are measured and compared with threshold values so as to select from among wheels mounted in different tracks of a rear axle of said vehicle one wheel which is first to show instability relative to another stable wheel on said axle and drive from the rotational speed of said one wheel slip control signals for controlling in respective cycles, first, a period of decrease and then a period of increase of the brake pressure in the brakes of both wheels on said rear axle, each period of pressure increase during any one anti-lock cycle in said brakes of the wheels on said rear axle being by the application of pressure raising pulse trains thereto in response to said slip control signals, said pressure raising pulse trains being defined by their pulse repetition rates, characterized in that the brake of said one wheel which first is instable on said rear axle, having reached a stable state in response to release of pressure, is fed during each period of pressure increase with a pressure raising pulse train which has a smaller pulse repetition rate than the pressure raising pulse train applied to the brake of the other, stable wheel and thereby causes a smaller pressure rise in the brake of said one wheel than the pressure raising pulse train applied to the brake of the other, stable wheel of the rear axle, said pulse repetition rates being dependent on the amount by which the rotational retardation or slip of the one wheel exceeds a given threshold value, wherein a maximum value is predetermined for the pulse repetition rates.

* * * * *